United States Patent
Moraes

(10) Patent No.: US 8,605,870 B2
(45) Date of Patent: Dec. 10, 2013

(54) VIRTUAL SUBSCRIBER SERVICE

(75) Inventor: Ian Moraes, Suwanee, GA (US)

(73) Assignee: Movius Interactive Corp., Johns Creek, GA (US)

(\*) Notice: Subject to any disclaimer, the term of this patent is extended or adjusted under 35 U.S.C. 154(b) by 916 days.

(21) Appl. No.: 12/697,541

(22) Filed: Feb. 1, 2010

(65) Prior Publication Data

US 2010/0173605 A1 Jul. 8, 2010

Related U.S. Application Data

(63) Continuation-in-part of application No. 12/331,651, filed on Dec. 10, 2008, now abandoned.

(60) Provisional application No. 61/087,373, filed on Aug. 8, 2008.

(51) Int. Cl.
*H04M 1/64* (2006.01)

(52) U.S. Cl.
USPC .................................. 379/88.25; 379/201.11

(58) Field of Classification Search
USPC ........ 379/142.07, 88.12, 88.13, 88.22–88.25, 379/201.11
See application file for complete search history.

(56) References Cited

U.S. PATENT DOCUMENTS

| | | | | |
|---|---|---|---|---|
| 5,553,130 | A * | 9/1996 | Turner ..................... | 379/221.08 |
| 6,356,630 | B1 | 3/2002 | Cai et al. | |
| 6,393,108 | B1 * | 5/2002 | McElwee ................... | 379/88.19 |
| 6,411,685 | B1 * | 6/2002 | O'Neal ....................... | 379/88.14 |
| 6,418,306 | B1 * | 7/2002 | McConnell .................. | 455/413 |
| 6,628,765 | B1 * | 9/2003 | Bangs et al. ............ | 379/112.01 |
| 6,865,260 | B1 * | 3/2005 | Meadows et al. .......... | 379/88.22 |
| 6,947,738 | B2 * | 9/2005 | Skog et al. ................ | 455/426.1 |
| 7,023,967 | B1 * | 4/2006 | Andersson et al. ........ | 379/88.12 |
| 7,031,437 | B1 * | 4/2006 | Parsons et al. ............. | 379/88.12 |
| 7,127,051 | B2 * | 10/2006 | Bedingfield et al. ...... | 379/201.01 |
| 8,150,368 | B2 * | 4/2012 | Koch et al. ..................... | 455/406 |
| 2001/0036258 | A1 * | 11/2001 | Sugla ....................... | 379/211.01 |
| 2004/0120475 | A1 | 6/2004 | Bauer et al. | |
| 2006/0148495 | A1 * | 7/2006 | Wilson .......................... | 455/466 |
| 2006/0227956 | A1 | 10/2006 | Pearson | |
| 2009/0003569 | A1 * | 1/2009 | Forbes et al. ............ | 379/142.07 |

FOREIGN PATENT DOCUMENTS

KR 10-2003-0052222 A 6/2003

OTHER PUBLICATIONS

Wenyu Jiang et al., "Towards Junking the PBX: Deploying IP Telephony", AMC 2001, Figures 1-3, p. 180, right col. line 1-p. 184 right col. line 2.

\* cited by examiner

*Primary Examiner* — Simon Sing
(74) *Attorney, Agent, or Firm* — Smith Risley Tempel Santos LLC; Gregory Scott Smith

(57) ABSTRACT

A Virtual Subscriber Service (VSS) is a system and method for operators to provide multiple mutually exclusive telephone numbers, each with its own unique plan features, to a subscriber who is associated with a single terminating device. VSS makes it possible for a subscriber to manage communications directed toward any telephone number associated with his telephone as if any one of the telephone numbers were the only number associated with the telephone. Further, in addition to the primary number, a VSS subscriber can originate communications or return missed communications from the virtual telephone numbers associated with his terminating device. More specifically, some embodiments of a VSS involve the use of a pre-paid account associated with a telecommunications service that has a primary destination code as well as a virtual destination code directed toward a common terminating device such as a mobile telephone. Advantageously, embodiments of a VSS provide a telecommunications operator with a system and method that enables a subscriber to have an additional private telephone number, mutually exclusive from a primary telephone number, without purchasing another telephone or purchasing a multi-SIM card.

13 Claims, 4 Drawing Sheets

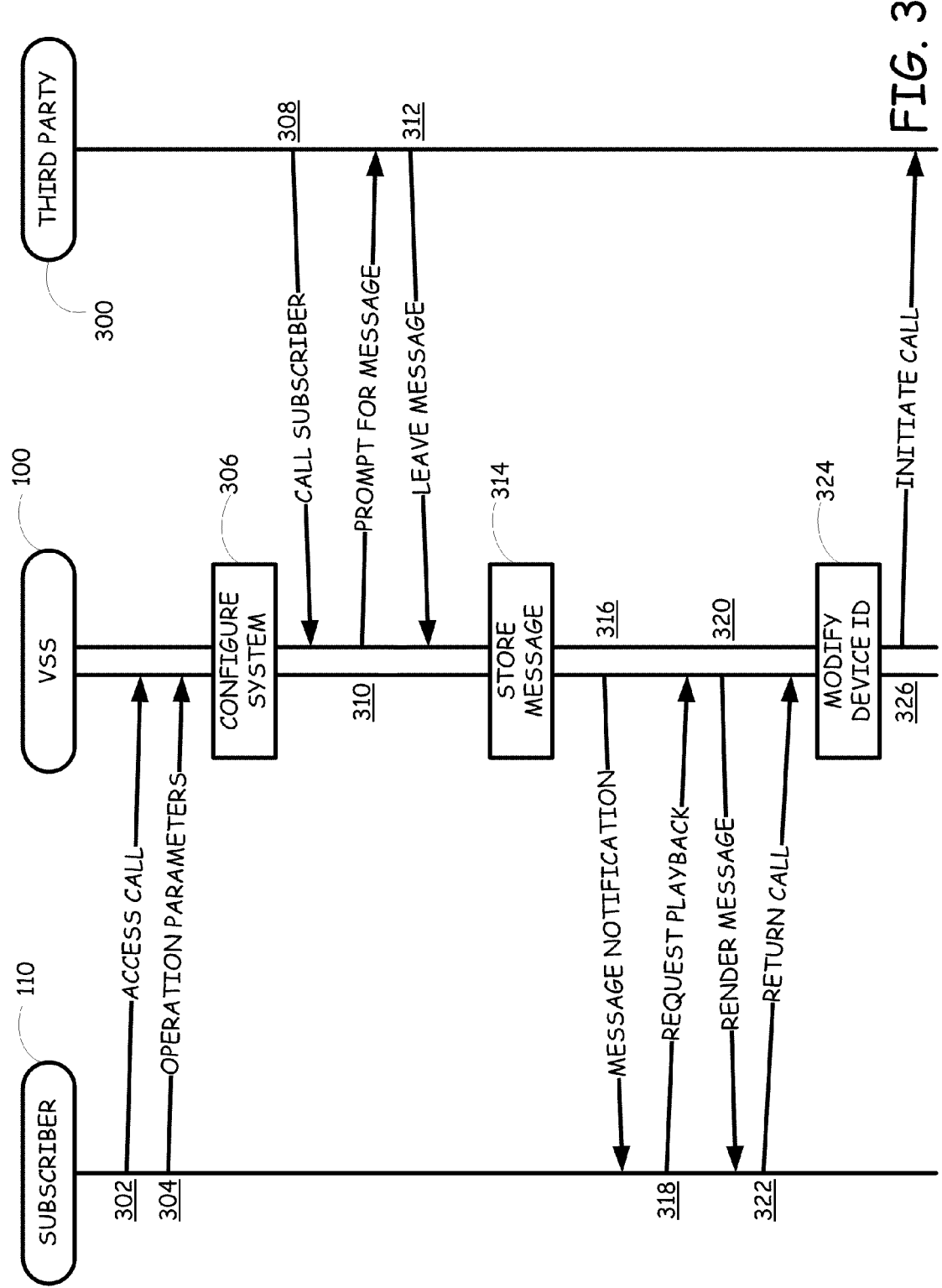

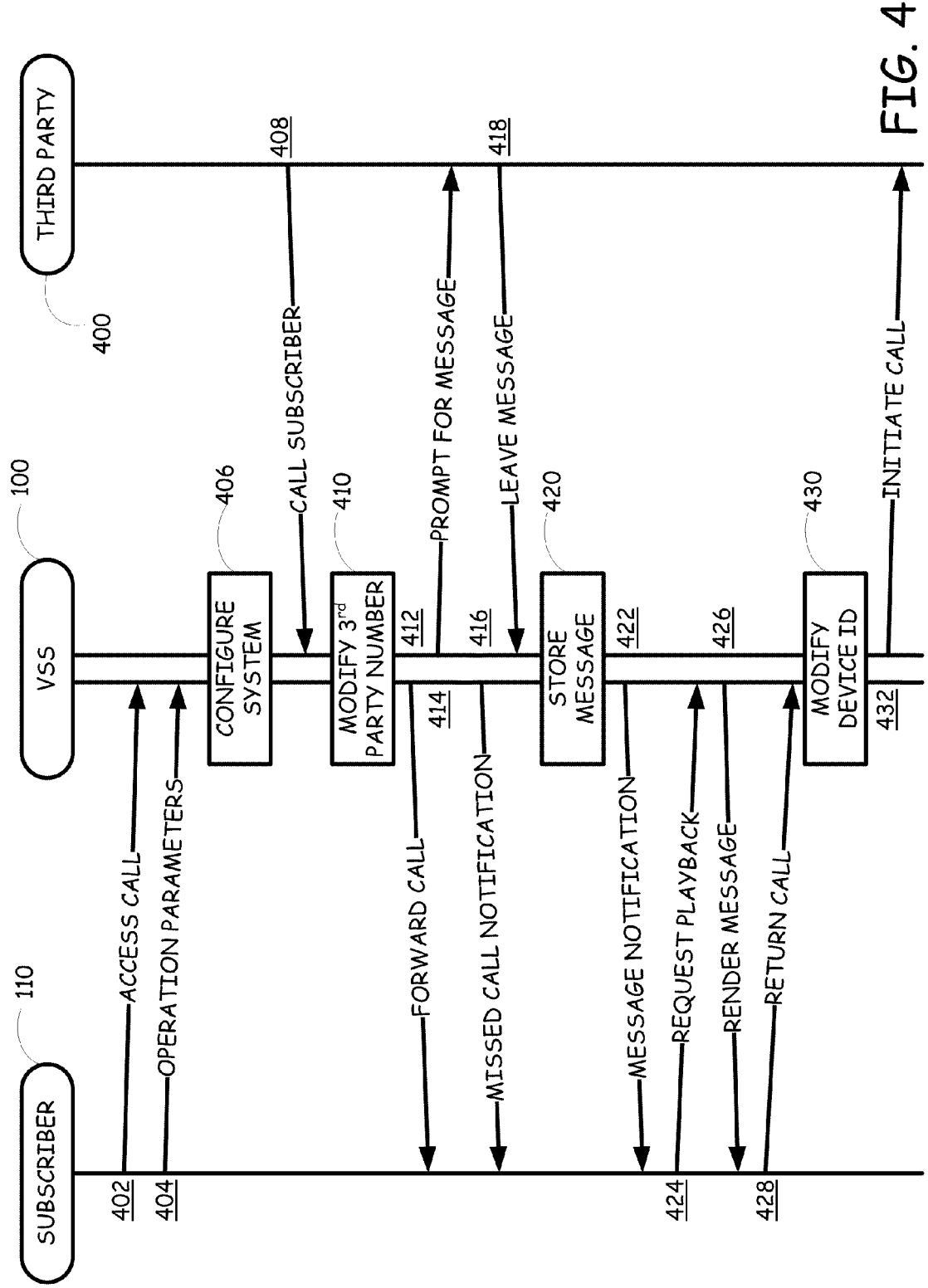

VIRTUAL SUBSCRIBER SERVICE

CROSS-REFERENCE TO RELATED APPLICATIONS

This application is a Continuation-In-Part of the United States application for patent filed on Dec. 10, 2008, now abandoned entitled COMMUNITY MESSAGING SERVICE, assigned Ser. No. 12/331,651, which claims the benefit of the filing date of the United States Provisional Application for patent that was filed on Aug. 8, 2008 and assigned Ser. No. 61/087,373, each of which is hereby incorporated by reference in its entirety.

BACKGROUND

If you're over thirty years of age, then you probably remember answering machines. What a breakthrough in communications technology! Answering machines became popular among the masses in the early 1980s as just about everyone who subscribed to a telephone service had one of those little black recording devices networked on their landline. Prior to answering machines, when placing a call, a caller was guaranteed one of three experiences: having his call answered, getting a "busy" signal, or listening to endless rings. Answering machines were revolutionary in that their use rendered endless rings as an obsolete feedback. With an answering machine in use, callers were guaranteed that somebody, or something, was going to answer the call.

While many folks, even today, still make use of the answering machine, the technology has long since advanced to what is commonly known as voicemail. Unlike an answering machine, a subscriber to a voicemail service advantageously doesn't have to be physically near his landline in order to listen to a message. Further, the digital nature of a voicemail system affords users access to many features including call forwarding, archiving, remote access, etc. The advantages of modern day voicemail are numerous.

For one to benefit from the convenience of voicemail, prior art requires that a person first subscribe to a telecommunications service. Additionally, in order to subscribe to a telecommunications service, regardless of whether such service includes voicemail or other useful features, prior art dictates that the subscriber must designate some kind of terminating device for that service such as a telephone, a modem, a PDA, a mobile telephone, etc.

Notably, the COMMUNITY MESSAGING SERVICE solution disclosed in the parent application of the present disclosure provides a novel system and method whereby a subscriber may benefit from a telecommunications service without having to designate a terminating device for such service. In addition to the need in the art addressed in the parent application, there is also opportunity for novel advancement in the art of telecommunications services associated with a subscriber's designated terminating device.

As the consuming public became more and more comfortable with the myriad features that may be associated with a subscriber's telephone service (such as voicemail, missed call logs, previously dialed logs, texting, automatic dial back, etc.), service providers, especially cellular service providers, began mixing and matching value added features in an effort to sell service plans as well as the devices, i.e. telephones, that were compatible with those plans. By doing this, if cellular telecommunications service providers intended to maximize market penetration, it worked. According to the CTIA-Wireless Association, a staggering 250 million Americans now subscribe to a cellular-phone service—that's over 80% of the population according to the last U.S. census. Even more eye popping is that the United Nations estimates that over 50% of people worldwide currently have a mobile telephone.

One Consumer, Two Services, Two Numbers, Two Telephones

Notably, as for those 250 million Americans, it's no stretch to say that many actually have multiple telephones. A 2006 USA Today study reported that 16% of telecommunications customers had separate telephones for personal and business use.

An all too common scenario entails a poor soul with multiple telephones on his hip. Inevitably, his employer has outfitted him with a company provided telecommunications service plan, as well as the obligatory telephone that goes along with it, and instructed him that his continued gainful employment depends on his not using the telephone for personal calls. As he's certain that somebody at the corporate office has nothing better to do than to watch the cell telephone bills like a hawk, a person that is probably likewise eager to keep a job, he's reluctantly obliged to also carry a personal telephone. He's one consumer with two service plans (one business and one personal), two telephone numbers (one for each plan) and, inconveniently, two telephones on his hip.

Multiple Consumers, One Service, One Number, One Telephone

The prior art has produced a number of ways to leverage a telecommunications service, in an effort to serve the needs of more consumers. A common telecommunications plan in many households today, for example, operates to provide multiple consumers using a single terminating device with personalized service plan features. Gone are the days when a household had to subscribe to multiple service plans, each plan being associated with a unique destination code (e.g., telephone number), in order for multiple household members to benefit from personalized service plan features such as voicemail.

At one time, if multiple members of a household required a personalized voicemail service, for example, each of those members had to subscribe to a separate telecommunications service and, thus, have a unique telephone number. Consequently, different terminating devices within the same household were designated for each unique telecommunications service such that "Mom and Dad" received calls on the telephone in the kitchen while "Sister and Brother" received calls on the telephone in the den. One advantage to such a scenario is that if the telephone rang in the den, then everyone knew that the calling party was trying to reach Sister or Brother. Another advantage was that any voice message deposited in the voicemail service associated with the telecommunications service directed to the den telephone was invariably intended for a party associated with that terminating device, i.e. Sister or Brother.

The disadvantages of having multiple telecommunications services coming into a single household are numerous. For one, with multiple services come multiple bills, multiple connection charges, and inflexibility as to terminating device placement within the household (for instance, in the above scenario, Mom and Dad could not "take" a telephone call in the den as the telephone jack in the den would be permanently associated with the "Brother and Sister" telephone service). As a result, service providers devised service plans whereby multiple household members could benefit from personalized plan features, such as voicemail, without the need to subscribe to unique service plans. For example, it became common for a single service plan, associated with a single destination code, to have multiple voicemail boxes so that each family member could benefit from a personalized message depository. As such, a calling party who dialed the telephone number for the household was given the option to perhaps "press 1" to leave a message for Dad, "press 2" to leave a message for Mom or "press 3" to leave a message for Sister or Brother. Advantageously, with such plans the benefit of not having a shared voicemail service could be had without subscribing to multiple telecommunications services. Therefore, multiple consumers (Mom, Dad, Brother and Sister) shared one service with one number (the common household telephone number) directed toward one telephone (every terminating device in the household).

One Consumer, One Service, Multiple Numbers, One Telephone

While the multiple consumers, one service, one number, one telephone approach had the advantage of providing multiple consumers, in a single household for example, with the benefits of personalized plan features on a common service, it was not without its disadvantages. For example, even though multiple family members in a single household enjoyed personalized plan features, such as voicemail, the single telephone number associated with the common service plan dictated that the family member targeted for an incoming call could not be readily recognized. Service plan embodiments with "caller ID" features helped in this regard as any family member in the household could check the "caller ID" on a visual display and, perhaps, determine the called family member but there was no way to uniquely direct a calling party to the correct family member. For instance, in a household, regardless of the family member being called, the calling party had to dial the single common destination code associated with the household service and, if no one answered the call, select the voicemail inbox associated with the targeted family member.

To overcome these limitations, service providers devised plans with multiple destination codes. For example, a single telecommunications service plan could be purchased for a household and multiple telephone numbers associated with the single service. As such, a household did not have to designate termination devices for unique service plans because a call placed to any one of the multiple telephone numbers associated with the common household service could be generally directed to all terminating devices in the household. Notably, while "Mom and Dad" could have one telephone number and "sister and brother" another number, all terminating devices within a household were operable to terminate a call placed to either of the associated numbers. To distinguish the destination code to which an incoming call was directed, service providers offered unique "ring patterns" so that the multiple consumers subscribing to the single service plan could readily discern which of the multiple destination codes was being called. Further, by associating unique ring patterns with each telephone number on a household service, devices such as faxes or modems could be configured to automatically "answer" the call based on recognition of the unique ring pattern.

While this one consumer, one service, multiple numbers, one telephone approach provided a means by which multiple unique telephone numbers, and the service features that go along with each, could be directed to common terminating devices associated with a single telecommunications service, many needs remained unfilled. For example, even though multiple numbers could be directed to common terminating devices, the telecommunications service was necessarily associated with a designated "primary" telephone number. For this reason, any call originating from a terminating device associated with the service would be recognized on the receiving end as originating from the primary number. So, in a scenario where "Mom and Dad" have one telephone number and "Sister and Brother" have a different telephone number, any call originating from the household would be associated with only one of the numbers (whichever was designated as primary, presumably Mom's and Dad's) regardless of the party making the call. Further, even though the "caller ID" features may be useful for discerning the source of a missed call, and by extension the targeted party within the household, a review of the "missed call log" derived from the "caller ID" function would provide no means for determining to which of the multiple destination codes the missed call was directed.

One Consumer, Multiple Services, Multiple Numbers, One Telephone

Notably, none of the prior art, taken alone or in combination, provides a subscriber with a means to fully benefit from the features associated with multiple telecommunications services without either requiring multiple terminating devices or that the benefits of a "primary" service be leveraged. For the most part, a subscriber that requires two mutually exclusive services must carry as many terminating devices. Certainly, a subscriber may "forward" calls directed toward the destination code of one service to the terminating device associated with a second service (e.g., forwarding a home telephone service number to a cellular service number), but such methodology does not avoid the consumption of services associated with the second service nor obviate the need for a terminating device to be associated with the first service. Therefore, what is needed in the art is a system and method for associating multiple telecommunications services, each with a unique destination code, feature set and billing practice, with a single terminating device such that a user in possession of the single terminating device may consume the benefits associated with multiple subscribed services without leveraging the benefits of one service against another.

BRIEF SUMMARY

A Virtual Subscriber Service (VSS) is a system and method for operators to provide multiple mutually exclusive telephone numbers, each with its own unique plan features, to a subscriber who is associated with a single terminating device. VSS makes it possible for a subscriber to manage communications directed toward any telephone number associated with his telephone as if any one of the telephone numbers were the only number associated with the telephone. Further, in addition to the primary number, a VSS subscriber can originate communications or return missed communications from the virtual telephone numbers associated with his terminating device. More specifically, some embodiments of a VSS involve the use of a pre-paid account associated with a telecommunications service that has a primary destination code as well as a virtual destination code directed toward a common terminating device such as a mobile telephone. Advantageously, embodiments of a VSS provide a telecommunications operator with a system and method that enables a subscriber to have an additional private telephone number, mutually exclusive from a primary telephone number, without purchasing another telephone or purchasing a multi-SIM card.

It will be understood that the verb "direct," as used in the present disclosure, is a general term most often used in connection with a VSS embodiment causing a communication to be connected or transmitted to a terminating device. As such, one skilled in the art of telecommunications systems and methods will understand that the verb "direct" is a term of the art that may comprise various system functions such as, but not limited to, forwarding, bridging, transferring, etc. and, accordingly, use of the verb "direct" will not be interpreted to limit the anticipated functionality of a given VSS embodiment.

In a typical embodiment, a VSS subscriber has a terminating device, such as a mobile telephone, with a service and a primary telephone number. The primary telephone number is associated with a telecommunications service that may include any number of plan features supported by the mobile device functionality such as, but not limited to, voicemail, call waiting, caller ID, missed call logs, received call logs, SMS texting capabilities, etc. As is well known in the art of a mobile telephone associated with a single telephone number, any call directed toward the primary number associated with the mobile telephone of a VSS subscriber may be "answered" by the mobile telephone, whether such answering takes the form of the subscriber accepting the call, the device logging the missed call, the device receiving and storing an SMS text, the device re-directing the call to a voicemail service, etc.

Moreover, as is typical in the art, service features uniquely associated with the primary number are readily accessible via the mobile device. For instance, actuation of pre-programmed key sequences such as, for example, "*VM" may cause the subscriber to be connected via the mobile device to the voicemail account associated with the primary number of the mobile device. Further, calls originating from the mobile device, whether voice, text, video or otherwise, will be recognized by a terminating device on the receiving end of the communication as coming from the telephone number associated with the originating device.

In addition to the primary telephone number associated with a subscriber's mobile telephone, a VSS subscriber may also associate one or more additional telephone numbers (i.e., virtual telephone numbers), as well as the unique service plan features that may go along with each, to the same terminating device already associated with a primary telephone number. As such, any advantage, aspect or feature supported by the mobile device can be accessed by the service associated with a virtual number mutually exclusive from the service plan associated with the primary number. Advantageously, a VSS subscriber may manage communications directed to, and originating from, the virtual telephone numbers in a way that does not leverage the services or benefits associated with the primary telephone number.

As an example, in some embodiments of a VSS, a subscriber may receive, via a configured mobile telephone, notifications of missed calls or new messages deposited in a voicemail account that is uniquely mapped to a virtual number associated with that mobile telephone. Upon responding to a notification, however, the mobile device functions as if the particular virtual number is the only number associated with the telephone. As such, returning a missed telephone call placed to the virtual number would result in the virtual number, and not the primary number, being displayed on the terminating device of the receiving party. Further, any airtime charges, minute pool debits, roaming charges, etc. would be counted against the service plan associated with the particular virtual number instead of the primary number.

Various embodiments of a VSS employ different methodologies for managing the mutual exclusivity of the features associated with a VSS subscriber's primary number from that which is associated with one or more virtual numbers. An exemplary embodiment of a VSS, upon receipt of a call directed toward a subscriber's virtual number, may modify the number associated with the calling party prior to directing the call to the mobile device associated with the virtual number. As a non-limiting example, such an embodiment may append a prefix such as "*56" to the calling party telephone number, i.e. ANI. Advantageously, a subscriber can then easily distinguish any call directed to the virtual telephone number from a call directed to the mobile device's primary number as any number in the mobile device's missed call log that was directed to the virtual number would be displayed with the appended prefix. Similarly, any call directed to the virtual number would appear with the appended prefix on the display of the mobile device. Additionally, any missed call to the virtual number that was returned by the subscriber would necessarily include the appended prefix such that the VSS, prior to routing the call to the destination, may recognize that the subscriber is calling from the virtual number and, in such an event, associate the virtual number with the outbound call. That is, in some embodiments, when a VSS subscriber "out-dials" to a destination code that has an appended prefix, the subscriber's virtual number is displayed as the "calling party" in lieu of the subscriber's primary number.

Even further, the configurable prefix could be used by a VSS embodiment for purposes beyond call routing such as, but not limited to, identification of a subscriber contact list or other account specific features. Also, some embodiments of a VSS may be configured such that a contact list associated with a subscriber's virtual number may be maintained on the VSS platform. Advantageously, a subscriber to a VSS may be able to query his contact list and initiate calls accordingly from the virtual account on the platform.

This same technique of using an operator-configurable prefix can be used by some embodiments to identify an SMS directed to a virtual number. The SMS sent to a virtual account can be deposited in a subscriber's standard inbox and the sender identified with a unique prefix. Similarly, an SMS originating from a subscriber device with an associated prefix may be sent with the sender identified as the virtual number as opposed to the device's primary number.

In a different exemplary embodiment, a subscriber may receive on his mobile telephone a missed call notification that comprises an embedded link. In such an embodiment, a called directed to a virtual number associated with the mobile device would have been terminated by the VSS and a message or other data deposited in association with the virtual number account. Upon receipt of the missed call notification, the subscriber may actuate the embedded link so that a separate service associated with the virtual number may be activated. At such point, the mobile device, and any actions taken with the mobile device may be mapped to the virtual service. The subscriber could then query stored voice messages that were the result of calls directed to the virtual number, place calls originating from the virtual number or generally benefit from any mobile device feature or function supported by the service associated with the virtual number (such as SMS, for example). Additionally, a VSS embodiment comprising an embedded link methodology could be configured to allow a subscriber to play a specific message deposited in connection with the virtual number without navigating multiple menus of an IVR. Even further, it is anticipated that in some embodiments a visual voice mail client on a subscriber's device may be used to manage messages deposited in connection with a virtual number.

In some embodiments, a mobile device comprised within a VSS may be configured such that access to features or aspects associated with a primary number or a virtual number may be controlled. An exemplary methodology of a VSS that comprises a mobile device configured to toggle between aspects and features associated with various telephone numbers may require the subscriber to "log in" to a profile associated with the primary number or any one of a set of virtual numbers. By logging into a profile stored within the mobile device, the features and aspects associated with the particular number may be accessed by the subscriber. In this way, any action subsequently taken by the subscriber, via the mobile device, may be recognized by the VSS as originating from the service or account associated with the particular number. For instance, a profile may have a unique contact list wherein every telephone number stored in the contact list begins with the aforementioned exemplary "*56," thereby providing a means by which the VSS system can map the correct telephone number to any outbound communication or direct the subscriber to a voicemail deposit intended for the "*56" profile. As another example, various profiles stored within the mobile device, each being associated with a unique telephone number, may trigger plan feature limits such as SMS text lengths, text message quantities, billing rates, available airtime, etc. Additionally, the various features of the mobile device itself may be optionally activated or deactivated according to a selected profile.

Some embodiments of a VSS may comprise pre-paid accounts associated with virtual telephone numbers. In such embodiments, access to the plan features may be subject to a properly funded pre-paid account. For instance, a voice message deposited at the VSS in connection with a called virtual number may trigger the VSS to transmit a notification to the mobile device associated with the virtual number. The subscriber, upon receipt of the notification that a voice message has been deposited in the voice mail depository associated with a virtual number, may retrieve the voice message on the condition that a pre-paid account is properly funded. As another example, a subscriber may only be allowed to place a call with his mobile device that originates from the virtual number if the pre-paid account is properly funded to do so. Such embodiments of a VSS that comprise a pre-paid account aspect provide a subscriber with what amounts to a supplementary pay-as-you-go telephone number.

An advantage of a VSS is that subscribers have the capability to segment callers to specific numbers without acquiring an additional telephone or purchasing a multi-SIM implementation. Further, in many embodiments, a subscriber can enable or disable the capability to redirect a live call for a virtual number to his/her mobile telephone.

A commonality among embodiments of a VSS is that a subscriber may independently access and manage multiple telephone numbers via a single terminating device. While most examples offered in the present disclosure are directed at embodiments of a VSS featuring a mobile cellular device, it will be understood that such is not intended to limit the application VSS embodiments and that it is anticipated that some embodiments may be directed toward POTS telecommunication services, cable services, satellite services, etc. Further, it is anticipated that a subscriber's single terminating device may be a cellular device, a wireless device in communication with a landline, a stationary device or any device generally suitable for termination of a telecommunication.

BRIEF DESCRIPTION OF THE SEVERAL VIEWS OF THE DRAWING

A full and enabling disclosure of various embodiments of the present invention, including the best mode thereof is set forth in this specification which makes reference to the appended figures in which:

FIG. 3 is a timing diagram showing the relationship between actions of a subscriber, a calling party and a virtual subscriber service configured to receive voice messages.

FIG. 4 is a timing diagram showing the relationship between actions of a subscriber, a calling party and a virtual subscriber service configured to forward live calls.

DETAILED DESCRIPTION OF EMBODIMENTS OF THE INVENTION

Figure 1:
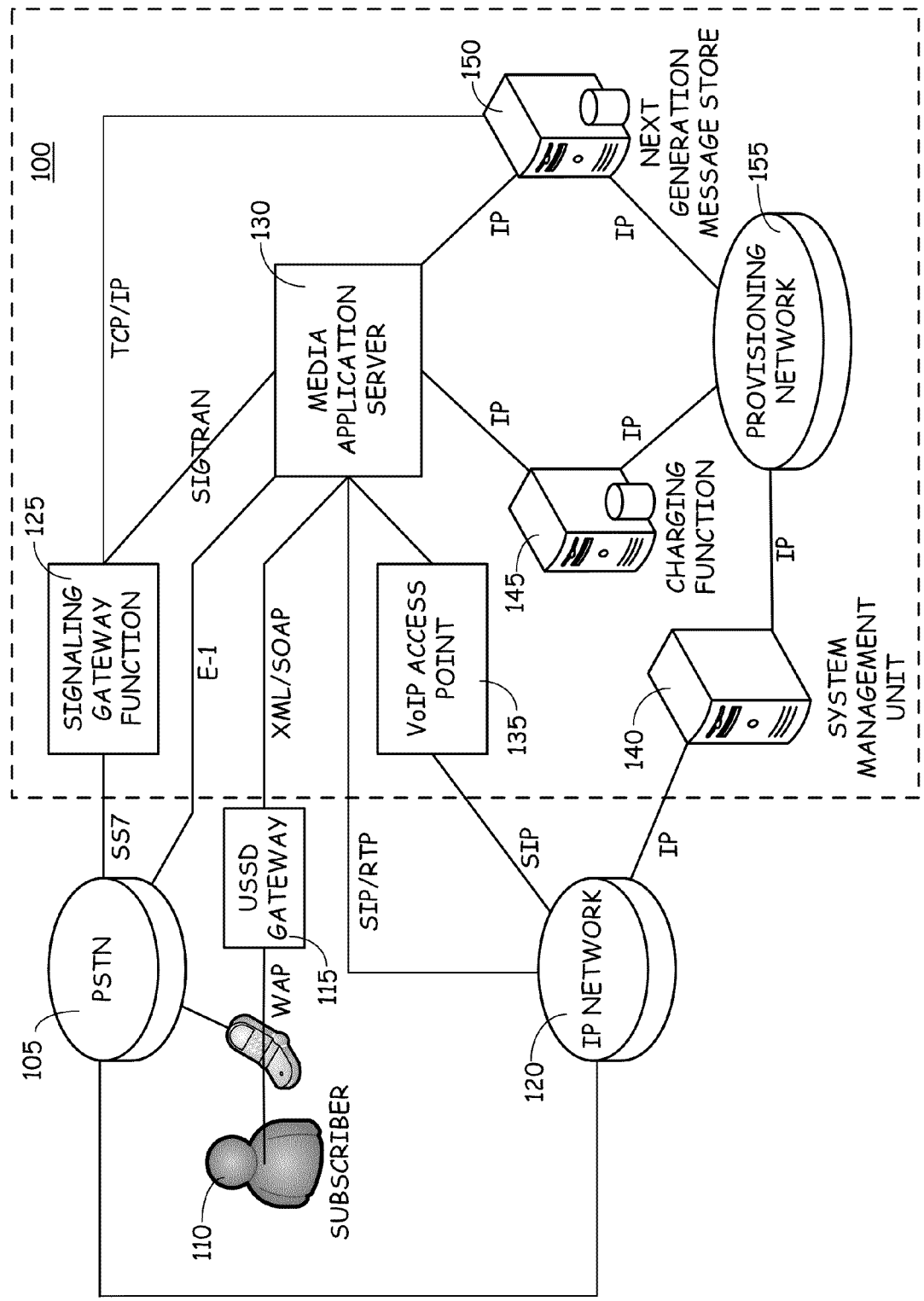
FIG. 1 is a system diagram depicting an exemplary architectural environment suitable for deployment of at least one embodiment of Virtual Subscriber Service (VSS).

Various embodiments of a Virtual Subscriber Service (VSS), along with aspects and features thereof, provide a solution to the above-described needs in the art, as well as other needs in the art by providing a subscriber the means to independently access and manage multiple telephone numbers, and the correlating services, via a single terminating device.

Some VSS embodiments provide a subscriber with a supplementary, prepaid or "pay-as-you-go" personal telephone number. It will be understood, however, that while an aspect of embodiments of a VSS is to provide a subscriber with a virtual telephone number, thereby obviating the need for a subscriber to acquire an additional terminating device, not all embodiments of a VSS will necessarily include a prefunded or "pay-as-you-go" account. It is anticipated that some VSS embodiments may be operable to charge subscribers according to other billing models known in the art such as, but not limited to, flat monthly service rates. Further, it will be understood that other embodiments of a VSS may not even include or require a billing aspect.

A VSS provides a system and method for directing calls to a subscriber's mobile telephone via a secondary destination number. Advantageously, when in communication with the system of a telecommunications service provider, a VSS can provide a telecommunications subscriber with an additional private telephone number, i.e. a virtual telephone number, without requiring the subscriber to purchase another termination device, such as a mobile telephone, or purchasing a multi-SIM card. It will be understood that even though the embodiments and illustrations disclosed herein generally reference a subscriber's terminating device as a mobile device, it is anticipated that a terminating device may be any device operable to terminate a call and configured to communicate with a VSS. Moreover, the examples and illustrations described in this disclosure are offered for explanatory purposes and will not be construed to limit the scope of a VSS.

Some embodiments of a VSS generally operate to terminate calls directed at virtual numbers of subscribers, store messages received as a result of such call terminations, and notify subscribers of deposited messages. Other embodiments may be operable to direct a received call to the mobile device associated with the virtual number such that the subscriber may receive a live call placed to the virtual number. Still other embodiments may be operable to notify subscribers of missed calls and new messages deposited for a virtual number on the subscriber's configured mobile telephone. Even further, in some embodiments, a new message notification forwarded to a subscriber's mobile device may include an embedded link operable to connect the subscriber's mobile device directly to a deposited message without requiring the navigation of menus in an IVR. Also, some embodiments may comprise a link embedded in a missed call notification that would enable a subscriber to access the VSS for the purpose of returning a call.

VSS embodiments provide a subscriber with an additional telephone number without having to own an additional telephone. In many embodiments, VSS subscribers can also receive live calls directed at the virtual number, even though the mobile device associated with the subscriber's virtual number is also associated with a primary number. Advantageously for VSS subscribers, acquiring a secondary or supplementary number that may be directed at an existing mobile device already associated with a primary number may be a cost-effective means to segment calling parties to specific numbers without acquiring an additional mobile device or purchasing a multi-SIM implementation. Further, some embodiments include a means to receive voicemail on the virtual number account, thereby ensuring that subscribers do not miss important communications directed to a virtual number. Subscribers can also use a VSS virtual number to receive voice messages unobtrusively, securely and/or privately and also to make international calls.

Some embodiments of a VSS may be configured by a subscriber via the mobile device. For example, some embodiments may be operable to receive Unstructured Supplementary Service Data (USSD) communications from a subscriber's telephone for the purpose of activating or deactivating various features associated with the subscriber's account. Also, some embodiments may be configured by a subscriber via an IVR menu.

Turning now to the drawings in which like labels represent like elements throughout the drawings, various aspects, features and embodiments of a VSS will be presented in more detail. The examples, as set forth in the drawings and the detailed description, are provided by way of explanation of a VSS and are not meant as limitations of a VSS. A VSS thus includes any modifications and variations of the following examples as come within the scope of the appended claims and their equivalents.

FIG. 1 is a system diagram depicting an exemplary architectural environment suitable for deployment of at least one embodiment of a Virtual Subscriber Service (VSS) 100. The conduit that connects a subscriber to a VSS 100 within the network depicted in FIG. 1 is the Public Switched Telephone Network (PSTN) 105. Notably, for the purposes of this disclosure, use of the term PSTN is not intended to be limited in scope such that it only anticipates the traditional telecommunications network comprised of landlines and circuit switching means. Rather, it will be understood that PSTN is herein intended to comprise the myriad telecommunications network types that collectively operate to provide for telecommunications services including, but not limited to, wireless networks, landline networks, circuit switched networks, packet switched networks, satellite networks, etc.

In one embodiment of a VSS 100, a subscriber 110 to the VSS service places a call via a designated device to the VSS 100 platform. As is typical of calls placed on the PSTN, the call is transported in the Signaling System 7 (SS7) protocol and directed through the PSTN 105 to a Signaling Gateway 125. The Signaling Gateway 125 converts the SS7 data into SIGTRAN, the standard telephony protocol used to convert and forward SS7 signals over the Internet. From this point, the subscriber's 110 call data is forwarded to a media application server (MAS) 130 used to run the VSS Telephony User Interface (TUI) application. The MAS 130 is in communication with a local provisioning network 155 that includes various database servers 145, 150 and at least one System Management Unit 140. In processing the subscriber request to retrieve voice mail previously deposited in association with a virtual number, or initiate some other task, the MAS 130 may communicate via an internet protocol over the local provisioning network 155 to call for applets running on any of the various other database servers. For example, functions such as subscriber profile verification, message storage and retrieval, personal greeting or spoken name playback, voucher management, account debiting, etc. may reside in a slave server on the Provisioning Network 155 such as the Next Generation Message Store database server (NGMS) 150 or the Charging Function database server (CF) 145 depicted in FIG. 1. Further, the System Management Unit (SMU) 140 residing on the Provisioning Network 155 provides a means for querying, manipulation, and configuration of the VSS system by the service provider.

It should be appreciated that FIG. 1 is a non-limiting example of a suitable architectural environment for the employment of the VSS system. Those skilled in the arts of system architecture, networking, and programming, or any combination thereof, may modify the system described herein and depicted in FIG. 1 without changing the novelty of the present invention. For example, the applets used to process various requests for features associated with the VSS may reside on multiple application servers, such as those depicted in FIG. 1, or alternatively be configured to run on a single, multi-functional server with virtual machine environments. Advantageously, regardless of the network specifics of various embodiments, a common aspect among embodiments of a VSS is that subscribers and users in possession of a terminating device that has a primary destination number may employ the VSS without having to acquire an additional termination device or designate a Subscriber Identification Module (SIM) unique to a VSS virtual number.

Various embodiments of a VSS 100 support common interfaces for integration with existing network components. For example, multiple message notification protocols such as, but not limited to, SMPP, SMTP, and CIMD2 are supported. Further, VSS 100 management and control may be supported via SNMP for alarms and statistics and, further, some embodiments can also be integrated with a telecommunications system operator's existing network management software applications.

An alarm management tool on the SMU 140 of some embodiments can be used to view fault information on VSS 100 components. Fault information monitored by some embodiments may include, but is not limited to, alarm ID and type, description, status, severity, name and type of device that generated the alarm, time stamp, and MIB value. Further some embodiments may be configured to provide system administrators with a comprehensive monitoring guide that includes alarm descriptions. In addition, the SMU 140 component that is included in some embodiments of a VSS may comprise a network management control center including web-based interfaces for provisioning, management and reporting.

As described prior, a subscriber 110 to a VSS is provided with a virtual telephone number that may be associated with a mobile telephone already having a primary telephone number. A call placed to the virtual telephone number is initially routed to the VSS 100 over the PSTN 105, via the SGF 125, and terminated at the MAS 130 component. In some embodiments, the MAS 130 may be configured to prompt the calling party to record a voice message for later retrieval by the called party (subscriber 110). Any recorded voice message may be stored in the NGMS 150 component, or the like.

In other embodiments, instead of automatically prompting a calling party to leave a voice message, the MAS 130 may be configured to direct the received call to the mobile device of the subscriber 110, thereby enabling the subscriber 110 to receive a live call, which was directed to a virtual number, on a mobile device associated with a primary number. Advantageously, prior to directing the received call to the mobile device of the subscriber 110, some embodiments modify the number of the calling party with a prefix or some other descriptor such that the number of the calling party is readily recognizable by the subscriber to be associated with the virtual number, as opposed to the primary number. In this way, a subscriber 110 can easily discern that an incoming live call is intended for the virtual number and/or distinguish the call in a call log on his mobile device from other calls which may have been directed at the primary number. Further, in such an embodiment, the subscriber 110 may be able to return a missed call or direct an outgoing call to a modified number such that the call is automatically routed through the VSS 100, interpreted by the VSS 100 to be intended for the destination code represented sans modification, and subsequently directed to the targeted party. Notably, by modifying the incoming and outgoing destination codes associated with a virtual subscriber's account, the subscriber 110 can manage the communications associated with his virtual number separately from the communications associated with his primary number. Further, the activities performed on the mobile device that were in regards to the virtual account can be distinguished from the activities associated with the account of the primary number, thereby providing a subscriber with two mutually exclusive telephone number accounts via a single terminating device.

Some embodiments of a VSS may be configured such that a subscriber 110 may receive a notification in the event that a message has been deposited at the VSS in association with the subscriber's virtual number. Notably, as VSS embodiments are operable to integrate with the existing telecommunications service platforms of a service provider which is administering an account or service associated with a subscriber's primary number, any communications made by the subscriber 110 to the VSS via the designated device can be easily filtered through the VSS and mapped to the account/service of the subscriber's virtual number.

Some embodiments of a VSS are operable to allow subscribers to configure the service to enable receipt of a live call directed to a virtual number or, alternatively, dictate that calling parties to a virtual number are directed to a message depository. In a VSS configured such that live call receipt is disabled, or in an embodiment that does not offer a live call directing feature, some embodiments store a message and subsequently notify the subscriber via a Wireless Access Protocol (WAP). For instance, a VSS operable to disseminate notifications to subscribers may comprise an MAS 130 that is in communication with a USSD gateway 115 such that a notification may be forwarded to the subscriber's mobile device. It will be understood, however, that protocol technologies useful for notification of subscribers will be known to those skilled in the art and, as such, the use of USSD protocol will not limit the scope of a VSS. Other protocols and methods useful for notification of subscribers include, but are not limited to, Short Message Service (SMS) via SOAP, High-Speed Circuit-Switched Data (CSD) and General Packet Radio Service (GPRS), SMSC via SMPP or Service Delivery Platform (SDP) interfacing. Further, it will be understood that WAP protocols and methodologies may be used by some embodiments of a VSS for bi-directional communication with a subscriber's device such that the subscriber may communicate with the VSS for the purpose of leveraging features of the virtual number service and/or configuring the service.

In addition to employing WAP for dissemination of notifications to subscribers, some embodiments may also leverage other functional aspects of a USSD Gateway. For example, in some countries, USSD is far cheaper to use than SMS or voice call protocols. In such a deployment, some embodiments of a VSS may use USSD as a means for a subscriber to enable/disable the service or, for that matter, activate/deactivate any number of VSS features. To do so, an exemplary VSS embodiment may comprise an application that is developed on the USSD Gateway and uses the XML/HTTP API or SOAP based API to enable a subscriber to manage VSS features.

In some embodiments of a VSS, the VoIP Access Point (VAP) 135 provides the single interface to the service provider's network and serves as a Session Initiation Protocol (SIP) Redirect Server. The VAP 135 routes calls to individual Media Application Servers 130. The public IP address of the VAP 135 (the one assigned the Ethernet connections to the customer network) is the address of the VSS "end-point" programmed into the network proxy such that the proxy routes all virtual number calls to the VAP 135. The VAP 135 can use multiple call distribution schemes to choose the particular MAS 130 to handle the call. Notably, the VSS embodiment depicted in FIG. 1 will be understood to be exemplary in nature and, as such, all components illustrated in FIG. 1 are not necessarily required in all embodiments of a VSS. Further, some embodiments of a VSS may comprise multiple instances of any given component depicted in the figures, as the specific VSS application may require.

The exemplary embodiment 100 of a VSS includes a Charging Function (CF) 145 component that may be configured to deliver Subscriber Management, Voucher Management, and Call Rating functions. However, as previously disclosed, not all components depicted in the exemplary environment of FIG. 1 are required in all embodiments of a VSS and the CF 145 is an example of such. Notably, some embodiments of a VSS can be integrated with an operator's existing prepaid component and voucher management system. An advantage of such an embodiment is that there is no need to include an on-board component, such as the CF 145, as the operator's existing infrastructure can be leveraged. In such an exemplary VSS embodiment, the CF 145 would not be a required component as the MAS 130 could be interfaced with a soft switch in order to enable any required parameters to be passed to the operator's existing infrastructure, thereby leveraging the soft switch (not shown in FIG. 1) to handle call rating and prepaid charging aspects. Moreover, as was disclosed prior, some VSS embodiments may be configured to accommodate a standard post-paid service, thus not requiring a CF component for management of a prepaid account.

As previously disclosed, embodiments of a VSS are operable to integrate with a telecommunications service provider's existing system such that a subscriber to the service provider may benefit from the association of a virtual number with a mobile telephone, or some other terminating device, that already has a primary number provided by the service provider. The integration of a typical VSS includes the networking of the CF 145, among other components, to the service provider via a provisioning network 155.

Figure 2:
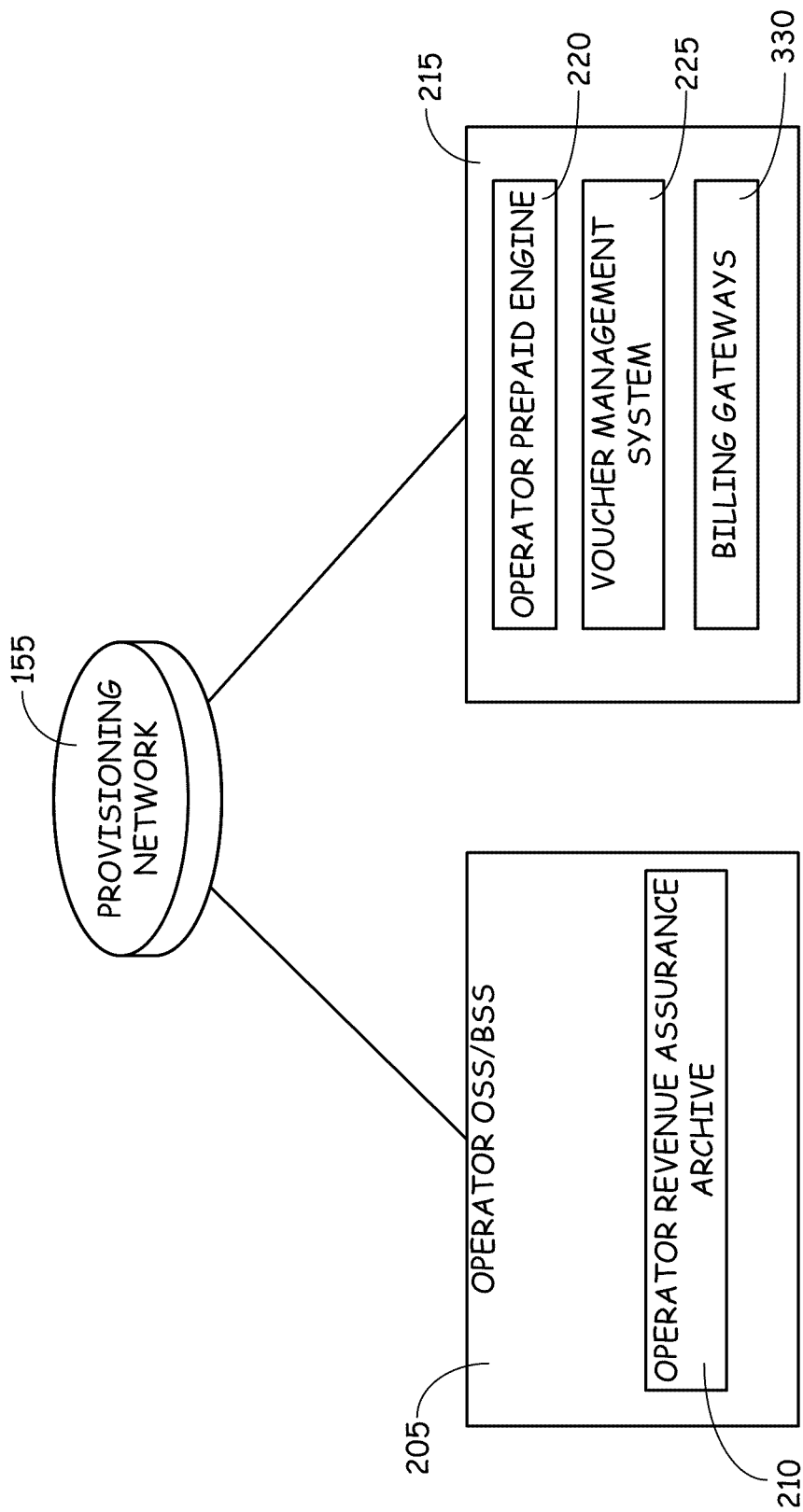
FIG. 2 is a diagram of service provider functions that may be leveraged by a VSS embodiment via communication through a provider's provisioning network.

FIG. 2 illustrates typical components and functionalities residing within a system provider's existing architecture, each of which may be in communication with the VSS via a provisioning network 155. Notably, some embodiments of a VSS are designed to integrate with a service provider's systems and, as such, require communication with the Operational and Business Support Systems 205 and other backend networks 215 in order to properly manage the virtual number accounts for subscribers to the primary services provided by the provider. Integration of a VSS with a service provider's support 205 and backend 215 systems via a provisioning network 115 may enable the VSS to access and leverage various existing systems such as, but not limited to, prepaid engines 220, voucher management systems 225, billing gateways 230 and revenue assurance archives 210. Advantageously, embodiments operable to closely integrate with the existing systems of a service provider may leverage existing resources in the provider's system thereby obviating the need to create such resources within the VSS proper.

FIG. 3 is a timing diagram showing the relationship between actions of a subscriber 110, a calling party 300 and a virtual subscriber service 100 configured to receive voice messages. The subscriber 110 is shown as initially accessing the VSS 100 by placing an access call to the system 302. Such an access call may be to a common system access number and the user may then be required to enter a code, or the call may be to a subscriber access number specifically assigned to the subscriber for system access, or the call may be to a virtual number assigned to the subscriber and also require a code to select administrative mode rather than message delivery mode. Moreover, as previously described, the access call to the system may be via USSD protocol or the like. When the call is terminated at the VSS 100, the subscriber may provide operation parameters, or configuration parameters or commands 304. In response to these commands or parameters, the VSS 100 then configures the system for the subscriber 306. Such configuration may include, but is not necessarily limited to, setting account preferences such as message notification, greeting recordation, etc. Further, the configuration of the VSS 100 does not necessarily have to be done by the subscriber via his mobile device, as in some embodiments the VSS administrator or telecommunications service provider may configure the system on the subscriber's behalf and in accordance with a given service plan.

Subsequent to this time, the VSS 100 is then available for third parties 300 to leave messages for the subscriber 110. It should also be appreciated that the subscriber 110 (or authorized entity) can repeat the configuration process after the initial configuration process to change, modify or augment the operation of the VSS 100. The third party 300 provides a message to the subscriber 110 by placing a call to the subscriber 110 using a virtual number specifically assigned to the subscriber 308. Once the call from the third party 300 is terminated by the VSS 100, the VSS 100 prompts 310 the third party 300 to leave a message. The message is then delivered to the VSS 100 312 and the VSS 100 stores the message for the subscriber 314.

Once a message has been stored 314 in association with a subscriber's virtual number, the exemplary VSS 100 may transmit a notification 316 to the subscriber's designated mobile device. As has been previously disclosed, it is an advantage of a VSS that the mobile device designated by the subscriber to the VSS is associated with both a primary number as well as a virtual number. The notification may be transmitted to the subscriber's mobile device via a WAP protocol or any means known in the art, as has been disclosed. Further, the notification may contain an embedded link for quick and convenient access back to the VSS 100 for message retrieval. In other embodiments, the notification may comprise the calling party's telephone number, which also may have been modified such that it is mapped to the subscriber's virtual number account as opposed to the primary number account associated with the mobile device.

Upon receipt of the notification 316, the subscriber 110 may access the VSS and request playback 318 of the deposited message. The VSS 100 may render playback of the message 320. After receipt of the message, the subscriber may return the call 322 to the third party 300 via the VSS 100 such that any actions taken across the VSS 100 are mapped relative to the virtual number. Embodiments of a VSS 100 may be configured to modify the mobile device identification 324 so that the primary number associated with the mobile device is amended to the virtual number when the subscriber uses the VSS to initiate 326 an outgoing communication. Advantageously, by amending the subscriber's mobile device ID to reflect the subscriber's virtual number, user devices on the receiving end of a subscriber's outgoing communications will reflect the source of the communication as the subscriber's virtual number.

FIG. 4 is a timing diagram showing the relationship between actions of a subscriber 110, a calling party 400 and a virtual subscriber service 100 configured to forward live calls. Similar to the VSS embodiment described relative to FIG. 3, the embodiment in FIG. 4 is initially configured via an access call 402 by an authorized entity for the purpose of setting account parameters 404. Once configured, any calls made to the subscriber's virtual number will be routed to the VSS 100 and terminated 408 on behalf of the subscriber 110.

As the exemplary VSS embodiment represented by the FIG. 4 timing diagram is operable to provide the subscriber 110 with a live call directed at the virtual number, the VSS 100 modifies the third party number 400 and forwards 412 such data to the subscriber's mobile device along with the call. Advantageously, by modifying the third party 400 number, the subscriber and/or the subscriber's device may readily recognize that the call is being placed to the subscriber's virtual number, as opposed to the primary number associated with the mobile device. Further, any return call or other actions made by the subscriber in response to the modified third party number will be automatically routed back through the VSS 100 and properly associated with the subscriber's virtual number account.

In the event that the subscriber does not answer the forwarded 412 call, the system may prompt 414 the third party 400 to leave a message for the subscriber. Upon leaving a message 418 by the third party 400, the system may store 420 the message and subsequently notify 422 the subscriber 110 of the deposited message by means that have been previously described. Notably, in the event that the third party 400 opts not to leave a message, some embodiments may still be configured to forward notification of a missed call to the subscriber's mobile device.

As was described relative to FIG. 3, upon receipt of a message notification, a subscriber may request playback 424 via his mobile device and the VSS 100 will render 426 such message accordingly. Further, the subscriber 110 may return 428 the call, his device ID being modified 430 prior to the system initiating 432 the outgoing communication on behalf of the subscriber's virtual account.

The Virtual Subscriber Service (VSS) has been described using detailed descriptions of embodiments thereof that are provided by way of example and are not intended to limit the scope of a VSS. The described embodiments comprise different features, not all of which are required in all embodiments of a VSS. Some embodiments of a VSS utilize only some of the features or possible combinations of the features. Variations of embodiments of a VSS that are described and embodiments of a VSS comprising different combinations of features noted in the described embodiments will occur to persons of the art.

It will be appreciated by persons skilled in the art that a VSS is not limited by what has been particularly shown and described herein above or in the attached exhibits. Rather the scope of a VSS is defined by the claims that follow.

What is claimed is:

1. A telecommunications system for associating multiple telephone numbers with a single terminating device, the telecommunications system comprising:
 a signaling gateway that interfaces to a telephone network and operates as a termination point for a call directed to a subscriber assigned number, wherein the subscriber assigned number is a virtual number having a unique service account and is associated with a terminating device, and wherein the terminating device is also associated with a primary number having a unique service account;
 a media server for providing an interactive user interface to a party calling the subscriber's virtual number, the media server being operable to:
  provide an interactive user interface to the calling party;
  receive and store a message from the calling party directed towards the subscriber;
  provide a message notification to the subscriber;
  allow retrieval of stored messages;
  in response to receiving a call directed toward a virtual number, modify the calling party number such that the call can be distinguished at the subscriber's terminating device from calls directed toward the terminating device's primary number, wherein the modification uniquely associates the number with the virtual number service account and directing the call to the subscriber's associated terminating device; and
 a provisioning system, accessible over an IP network by the media server, wherein the provisioning system is configured to provide message storage services and message retrieval services associated with the subscriber's virtual number service account.

2. The telecommunications system of claim 1, wherein the media server, in response to receiving a request from a subscriber to call a party associated with the modified telephone number, is further operable to initiate an outbound communication to the calling party.

3. A telecommunications system for associating multiple telephone numbers with a single terminating device, the telecommunications system comprising:
 a signaling gateway that interfaces to a telephone network and operates as a termination point for a call directed to a subscriber assigned number, wherein the subscriber assigned number is a virtual number having a unique service account and is associated with a terminating device, and wherein the terminating device is also associated with a primary number having a unique service account;
 a media server for providing an interactive user interface to a party calling the subscriber's virtual number, the media server being operable to:
  provide an interactive user interface to the calling party;
  receive and store a message from the calling party directed towards the subscriber;
  provide a message notification to the subscriber;
  allow retrieval of stored messages;
  in response to receiving a request from a subscriber, initiate an outbound communication; and
  associate the subscriber's virtual number with the outbound communication such that the terminating device of the receiving party recognizes the communication as originating from the subscriber's virtual number; and
 a provisioning system, accessible over an IP network by the media server, wherein the provisioning system is configured to provide message storage services and message retrieval services associated with the subscriber's virtual number service account.

4. A method for providing a subscriber a virtual destination code, wherein communications directed to the virtual destination code are directed to a terminating device that has a primary destination code, the method comprising the steps of:
 receiving, at a signal gateway to a virtual subscriber service platform, a communication directed to a virtual destination code, wherein the communication originates from a calling party destination code;
 terminating the communication at a media application server;
 prompting, by the media application server, the calling party to deposit a message;
 storing the message in a message store;
 determining, by the media application server, the primary destination code of a terminating device that is associated with the virtual destination code;
 directing a notification to the determined terminating device, wherein the notification serves to notify the virtual number subscriber that a message has been deposited in association with the virtual number.

5. The method of claim 4, wherein the notification is transmitted from the virtual subscriber service platform via a Wireless Access Protocol (WAP).

6. The method of claim 5, wherein the WAP is of a Short Message Service (SMS) type.

7. The method of claim 4, wherein the notification comprises an embedded link configured to, when activated, automatically direct the subscriber, via a browser application on the terminating device, to the virtual subscriber service platform for the purpose of retrieving the message.

8. The method of claim 7, further comprising the steps of:
 terminating, at the media application server, a communication originating from the subscriber's terminating device;
 receiving instructions from the subscriber to retrieve the stored message; and
 rendering the stored message to the subscriber.

9. The method of claim 8, further comprising the steps of:
 receiving instructions from the subscriber to originate a communication to a third party;
 determining the virtual destination code associated with the primary destination code of the subscriber's terminating device;
 coupling the determined virtual destination code with the outbound communication, wherein coupling the virtual destination code with the outbound communication serves to indicate to the third party that the communication is originating from the virtual destination code.

10. A method for providing a subscriber a virtual destination code, wherein communications directed to the virtual destination code are forwarded to a terminating device that is associated with a primary destination code, the method comprising the steps of:
 receiving, at a signal gateway to a virtual subscriber service platform, a communication directed to a virtual destination code, wherein the communication originates from a third party device associated with an originating destination code;
 terminating the communication at a media application server;
 determining, by the media application server, the primary destination code associated with a terminating device that is also associated with the virtual destination code;

modifying the third party originating destination code, wherein the modification serves to associate the third party communication as being directed through the virtual subscriber service;

directing the communication to the determined terminating device.

11. The method of claim 10, further comprising the steps of:

receiving, from the subscriber's terminating device, a communication directed towards the modified third party originating destination code;

terminating the received communication at the media application server;

determining, via the media application server, the destination code of the third party, wherein the destination code of the third party is identifiable from the modified destination code to which the communication was directed;

forwarding the communication to the determined third party destination code.

12. The method of claim 11, wherein the communication forwarded to the third party destination code is associated with the subscriber's virtual destination such that the third party terminating device recognizes the communication as originating from the virtual destination code.

13. The method of claim 12, wherein a subscriber service account associated with the virtual destination code is debited.

* * * * *